(12) United States Patent
Sporel

(10) Patent No.: US 9,419,977 B2
(45) Date of Patent: Aug. 16, 2016

(54) METHOD AND APPARATUS FOR PROVIDING VALUE-BASED RESOURCE MANAGEMENT AND ADMISSION CONTROL

(71) Applicant: Verizon Patent and Licensing Inc., Basking Ridge, NJ (US)

(72) Inventor: Eric Sporel, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 23 days.

(21) Appl. No.: 14/163,085

(22) Filed: Jan. 24, 2014

(65) Prior Publication Data

US 2015/0215317 A1   Jul. 30, 2015

(51) Int. Cl.
| | | |
|---|---|---|
| *H04L 12/18* | (2006.01) | |
| *H04L 29/06* | (2006.01) | |
| *G06F 17/30* | (2006.01) | |
| *H04L 12/911* | (2013.01) | |
| *G06F 21/10* | (2013.01) | |
| *H04N 21/239* | (2011.01) | |
| *H04N 21/258* | (2011.01) | |
| *H04N 21/262* | (2011.01) | |

(52) U.S. Cl.
CPC ............ *H04L 63/10* (2013.01); *G06F 17/3053* (2013.01); *G06F 21/10* (2013.01); *H04L 47/70* (2013.01); *H04N 21/2396* (2013.01); *H04N 21/25866* (2013.01); *H04N 21/26225* (2013.01); *H04L 2463/101* (2013.01)

(58) Field of Classification Search
CPC .................................................. H04L 12/1822
See application file for complete search history.

(56) References Cited

U.S. PATENT DOCUMENTS

| | | | |
|---|---|---|---|
| 2006/0282660 A1* | 12/2006 | Varghese et al. | 713/155 |
| 2007/0174613 A1* | 7/2007 | Paddon et al. | 713/168 |
| 2009/0178103 A1* | 7/2009 | Graham et al. | 726/1 |
| 2010/0157887 A1* | 6/2010 | Kopplin | 370/328 |
| 2011/0185436 A1* | 7/2011 | Koulinitch et al. | 726/28 |
| 2012/0167162 A1* | 6/2012 | Raleigh | G06F 21/57 726/1 |

* cited by examiner

*Primary Examiner* — Josnel Jeudy

(57) ABSTRACT

An approach for providing value-based resource management and admission control is described. A value-based platform may receive a request from a user or a service provider to access an asset, a service, or a combination thereof. The value-based platform may further apply a policy rule to account information associated with the user to determine a user value score. The value-based platform may also generate prioritization information for admitting the user to the asset, the service, or a combination thereof based on the user value score.

20 Claims, 8 Drawing Sheets

METHOD AND APPARATUS FOR PROVIDING VALUE-BASED RESOURCE MANAGEMENT AND ADMISSION CONTROL

BACKGROUND INFORMATION

The existing resource and policy management architectures are based on various standards defined by well-known telecommunication organizations. Most of these standards incorporate a simplistic view treating all incoming requests for admission to assets or services on a first come, first served basis. Each asset/service or customer is directly or indirectly related to revenue for a business and has different value to the business. However, the existing resource and policy management architectures do not consider values of the assets/services or customers. At the same time, it is challenging for the business to optimize the revenue from providing the assets or services when resources for providing the assets or services are limited.

Therefore, there is a need for a system capable of providing value-based resource management and admission control.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A method, apparatus, and system for providing value-based resource management and admission control, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to providing value-based resource management and admission control, it is contemplated that these embodiments have applicability to other systems operated by different entities and to other operations wherein data is retrieved.

Figure 1:
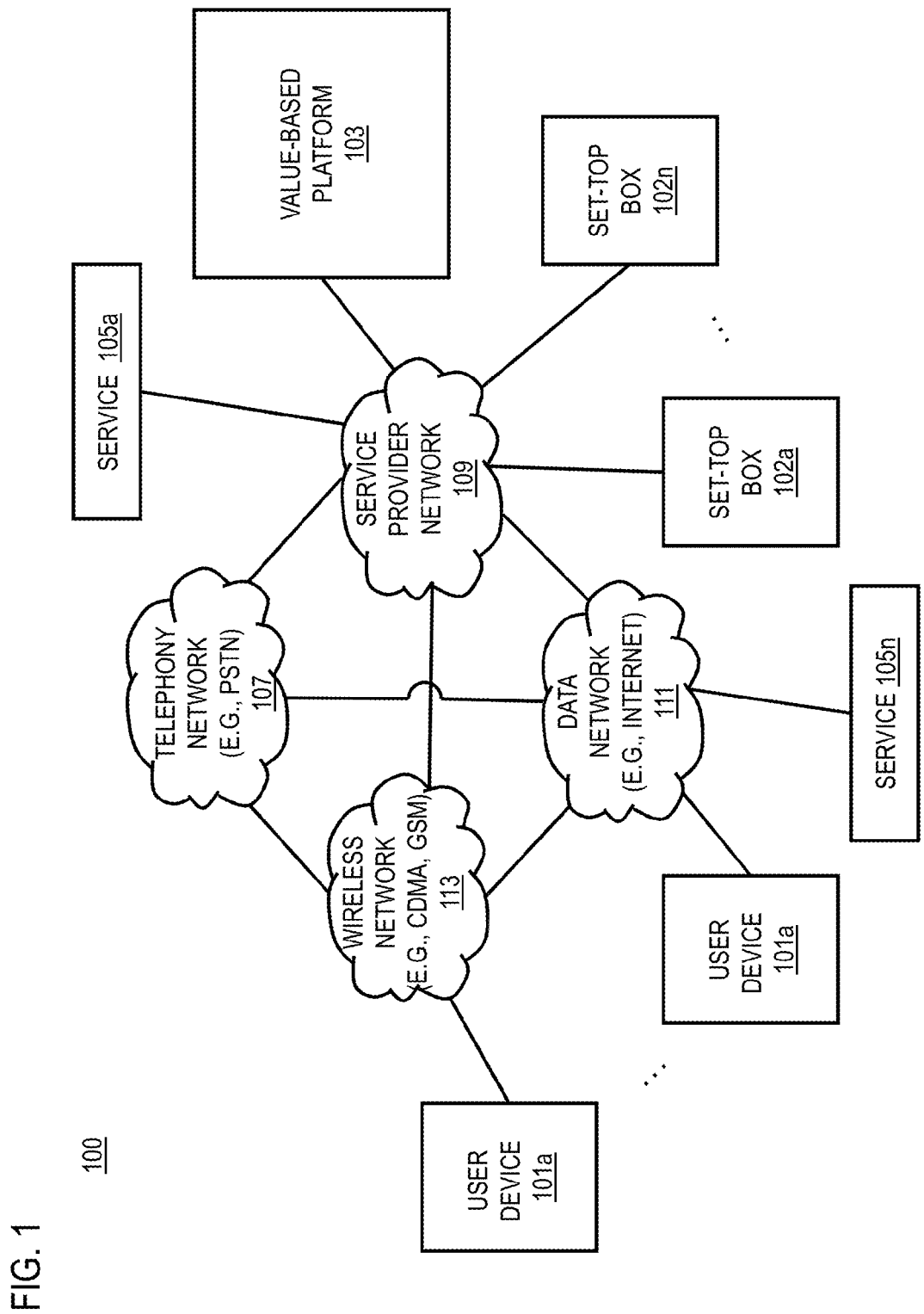
FIG. 1 is a diagram of a system capable of providing value-based resource management and admission control, according to an exemplary embodiment.

FIG. 1 is a diagram of a system capable of providing value-based resource management and admission control, according to an exemplary embodiment. As noted above, the existing resource and policy management architectures are based on standards defined by well-known telecommunication organizations (e.g., 3GPP, TISPAN, Broadband Forum, ATIS, etc.). Most of these standards incorporate a simplistic view that all incoming requests for admission to assets or services are considered on first come, first served basis, without considering a value of the asset or service and a value of a customer to a business. Each asset/service and customer incurs different level of revenue, and the revenue is related to a value to the business. On the other hand, it is challenging for the business to optimize the revenue from providing the assets or services when resources for providing the assets or services are limited.

To address this problem, a system 100 of FIG. 1 introduces the capability to provide value-based resource management and admission control. The system 100 may allow for considerations related to various business considerations that include but are not limited to the value of a particular asset or service being requested and/or the value of a customer within a large context of recurring revenue from the customer requesting the asset or service. For example, the system 100 may allow for consideration of additional parameters and an overall value of an asset (e.g., pricing per asset or service, subscription to premium service, asset duration, etc.) along with an overall value of a particular customer as part of an overall admission control decision to allow or deny an access to the asset or service. Although, hereinafter, the system 100 may be described within a context of a video service or a network service controlled by a policy manager, the system 100 may apply to general resource and admission control architectures as well.

Considerations related to a delivery of a particular asset or service may also be considered as part of the overall admission control decision. For example, in case of a video-on-demand (VOD) service, an asset (e.g., movie, TV episode, etc.) may be classified as either free (e.g., public broadcast contents) or paid (e.g., transaction-based, pay-per-view, or prepaid contents), or premium related (e.g., premium contents such as HBO). Further, the overall value of the customer to the business may also be considered as part of the overall resource and admission decision. A customer subscribed to a higher and the most expensive service tier may expect and receive priority decisions to allow or deny the requests for a particular asset or service.

When the policy or resource manager receives a request to access a given asset or service, the policy rules, which identify the overall value of the particular asset or service being requested along with the overall value of the customer to the business, would be considered as part of the comprehensive decision to allow the request. In one example, during periods of network congestion, a customer who is subscribed to the highest value video package (which includes premium contents) is allowed an access when the customer requests a paid VOD asset while other customer who is subscribed to only the basic video plan (which does not include premium content) is rejected when the other customer requests a free VOD asset. In other example, during periods of (marketing) promotion, low usage customers not currently and actively ordering VOD contents may be prioritized over higher usage or premium content subscribers.

The policy rules established in the policy or resource manager may include compiling an overall score or value of a customer based on a prior request to establish a value score of the subscriber within a given billing cycle as well as a value score of the VOD asset. The policy or resource manager may consider duration, pricing, and time of day as potential inputs to the decision to allow or deny the request. In addition, external data from an analytics engine may be used to update anticipated traffic profiles and subscriber value scores based on service usage that is not directly controlled by the policy manager but is desired to be used as part of the overall decision.

In one embodiment, the system 100 may include a value-based platform 103 implemented as, for example, part of a service provider network 109 to provide value-based resource management and admission control with respect assets or services from the service 105a-105n (collectively, service 105), where devices 101a-101n (collectively, user device 101) and set-top boxes 102a-102n (collectively, set-top box 102) may request accesses to the assets or services provided by the service 105. However, in alternative embodiments, the user device 101, the set-top box 102, the value-based platform 103, and the service 105 may be implemented as any part of the system 100. For example, the user device 101 may be implemented as part of the telephony network 107, the service provider network 109, the data network 111, or the wireless network 113. Also, the service 105 may be implemented as part of the telephony network 107, the service provider network 109, the data network 111, or the wireless network 113. Further, the value-based platform 103 may be implemented as part of the user device 101, set-top box 102, or the service 105. The service provider network 109 may interact with one or more of other networks (e.g., telephony network 107, data network 111, and the wireless network 113). Also, the set-top box 102 may be implemented as part of the service provider network 109 and services from the service 105 may be provided to the set-top box 102 over the service provider network 109.

In certain embodiments, the user device 101 may include any type of computing device comprising a mobile handset, mobile phone, mobile station, desktop computer, tablet computer, laptop computer, netbook computer, personal digital assistants (PDAs), smart phone, communication receiver, home phone, media receiver, wearable computer, set-top box (e.g., set-top box 102), etc. It is also contemplated that the user device 101 may support any type of user interface for supporting the presentment or exchange of data. In addition, the user device 101 may facilitate various input means for receiving and generating information, including touch screen capability, keyboard and keypad data entry, voice-based input mechanisms, and the like. Any known and future implementations of the user device 101 are applicable. It is noted that, in certain embodiments, the user device 101 may be configured to transmit information using a variety of technologies, including near field communication (NFC), radio-frequency identification (RFID), WiFi, Bluetooth®, infrared, etc. Also, connectivity may be provided via a wired or wireless local area network (LAN).

The set-top box 102 may include a device that connects to, or embedded in, a television, a monitor, media player, etc., and an external source of signal (e.g., media service provider), turning the signal into content which is then displayed on the television screen or other display device (e.g., game console, cable TV converter, IPTV receiver, etc.). The set-top box 102 processes signals for presenting audio-visual content (e.g., broadcast television programs, video-on-demand (VOD) programs, pay-per-view programs, Internet protocol television (IPTV) feeds, DVD related content, etc.), pre-recorded media content, data communication services content (e.g., commercials, advertisements, videos, movies, songs, images, sounds, etc.), Internet services content (streamed audio, video, or image media), and/or any other equivalent media form. As noted above, the user device 101 may include the set-top box 102.

In certain embodiments, the value-based platform 103 may receive a request from the user device 101 or the set-top box 102 of a user to access an asset or service provided by the service 105. In certain embodiments, the value-based platform 103 may receive a request from a service provider of the service 105, where the request is based on a user request received from the user device 101 or the set-top box 102 to access an asset or service. In that way, the interfaces between the servers of the service 105 and/or the value-based platform 103 may be standardized and may not complicate communications with the user device 101 or the set-top box 102. The value-based platform 103 may apply a policy rule to account information associated with the user to determine a value score of the user. The value-based platform 103 may also apply the policy rule to marketing information associated with the asset or service to determine a value score of the asset or service. The policy rule determines the value score of the user and the value score of the asset or service based on revenue information, which is associated with the account information, promotional information, network information, marketing information, etc. Further, the value-based platform 103 may generate prioritization information for admitting the user of the user device 101 or the set-top box 102 to the asset or service based on the value score of the user, the value score of the asset or service, historical user value score (determined based on the account information), contextual information (associated with the user, asset or service, etc.), etc.

Further, the value-based platform 103 may initiate a management of a resource for providing the asset or service based on the value score of the user. The management of the resource may include reserving and allocating a portion of the resource for the user. In case of the user's request to access the asset or service is denied, the value-based platform 103 may provide an alternative asset or service to the user device 101 or the set-top box 102 in place of the requested asset or service based on the prioritization information.

In certain embodiments, the service 105 may include any type of services that can be provided to the user device 101 and the set-top box 12 via the network 107-113. The service 105 may include video-on-demand (VOD) service, home shopping service, game service, social network service, video call service, messaging services, etc. The service may also contain assets (e.g., contents) including movies, music, game applications, pictures, ebook, etc. The service 105 may also include a system comprising hardware (e.g., computers, servers, etc.) and software (e.g., applications) for providing the assets or services. The service 105 may provide as tiered services, such as basic, advanced, premium services. The service 105 may set different prices for the assets or services based on the tiers. The service 105 may comprise an asset storage containing the assets indexed and categorized based on their property information (e.g., price, type, release date, duration, popularity, quality, rating, revenue, etc.)

For illustrative purposes, the networks 107-113 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, the networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, the networks 107-113 may embody or include portions of a signaling system 7 (SS7) network, or other suitable infrastructure to support control and signaling functions.

Figure 2:
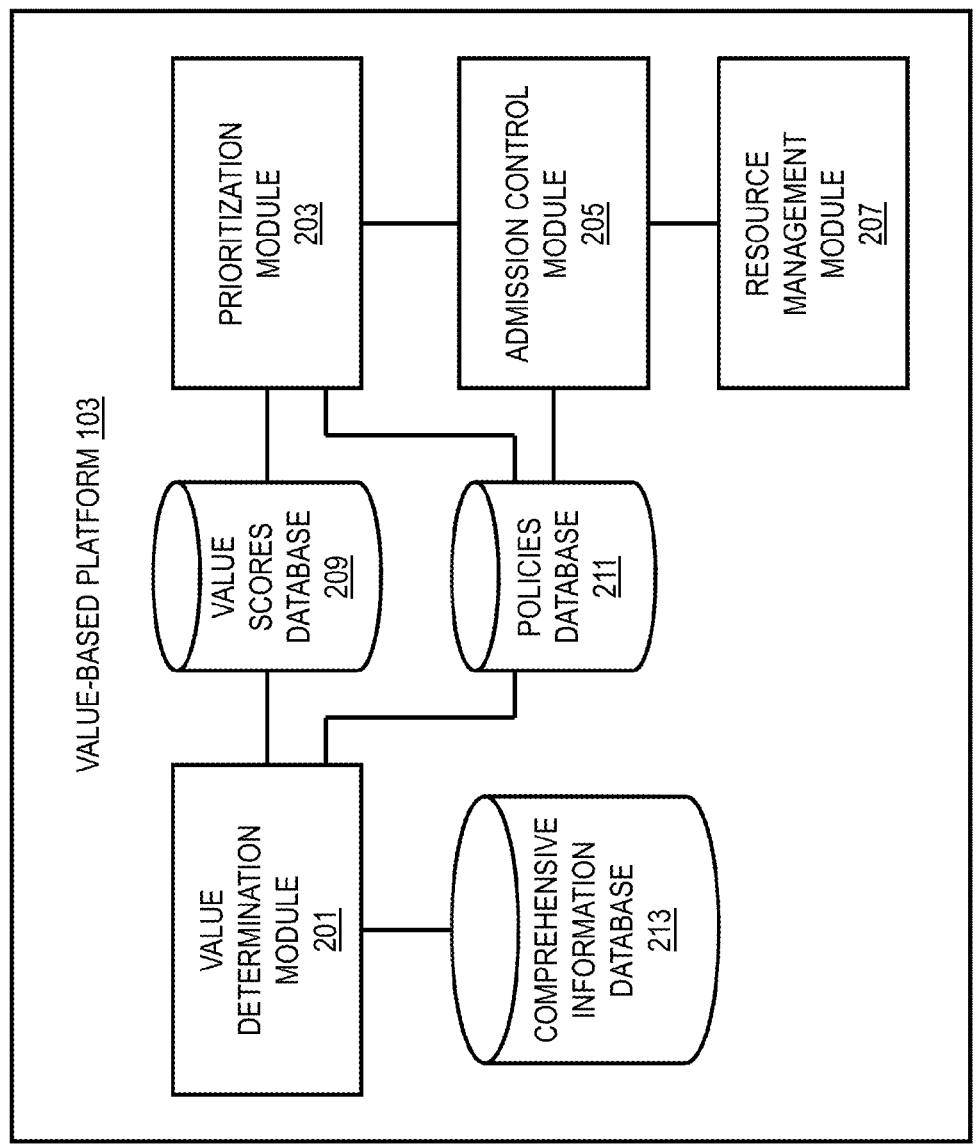
FIG. 2 is a diagram of a value-based platform utilized in the system of FIG. 1, according to an exemplary embodiment.

FIG. 2 is a diagram of the value-based platform 103 utilized in the system of FIG. 1, according to an exemplary embodiment. The value-based platform 103 may include a value determination module 201, a prioritization module 203, an admission control module 205, a resource management module 207, a value scores database 209, policies database 211 and comprehensive information database 213. Any of the above components may be external to the value-based platform 103. For example, the comprehensive information database 213 may be external to the value-based platform 103, and the information in the comprehensive information database 213 may be retrieve through the networks 107-113. Also, the external data from an analytic engines may be kept in the comprehensive information database 213 external to the value-based platform In one embodiment, the value determination module 201 may be configured to determine a value score of the user (i.e., user value score) and a value score of the asset or service (i.e., asset/service value score), and a historical user value score. The value determination module 201 may determine the user value score and the asset/service value score based on the (admission) policy rules retrieved from the policies database 211. The value determination module 201 may also determine the historical user value score for the user based on the account information associated with the user. The user's account information and previous value scores may be retrieved from the comprehensive information database 213. Further, the value determination module 201 may determine the user value score and the asset/service value score based on revenue information associated with the account information, promotional information, and/or network resource availability information, which may be stored in the comprehensive information database 213. For example, the value determination module 201 may determine a higher value score for the assets or services, or the user, related to a higher revenue generation and a lower value score for other assets or service, or other user, related to lower revenue generation.

In one embodiment, the prioritization module 203 may be configured to generate prioritization information for admitting the user of the user device 101 or the set-top box 102 to the asset or service of the service 105 based on the value scores determined by the value determination module 201 (e.g., value score of the user, value score of the asset or service, historical user value score, etc.). The prioritization module 203 may generate the prioritization information further based on contextual information associated with the user and/or the asset or service. For example, the prioritization module 203 may give a higher priority to the user, or the asset or service, with a higher value score while giving lower priority to other user, or other asset or service, with a lower value score. Depending on the (admission) policy rules, the prioritization module 203 may generate different priority information for the user, or the asset or service. When value scores for two different users are the same, the two users may be given same priority, or the first requested user may be given a higher priority over the later requested user (e.g., first come, first served basis).

In one embodiment, the admission control module 205 may be configured to determine the admission of the user to the asset or service based on the prioritization information generated by the prioritization module 203. The admission control module 205 may receive a request to access the asset or service from the user of the user device 101 or the set-top box 102. Based on the request, the value score and the priority information for the user and/or the asset or service may be determined by the value determination module 201 and the prioritization module 203. The admission control module 205 may receive the prioritization information from the user from the prioritization module 203. The admission control module 205 may allow or deny the user's request to access to the asset/service based on the received prioritization information. The admission control module 205 may grant the access to a user with a higher priority over other user with a lower priority, or vice versa, depending on the (admission) policy rule, especially when the resources (e.g., network bandwidth, CPU usage, etc.) are limited.

In one embodiment, the admission control module 205 may not only allow or deny the user's request for an access to the asset or service, but also may provide an alternative option, or alternative asset or service, to the user who has been denied the access to the requested asset or service. For example, the admission control module 205 may provide the denied user an alternative option to accept the same asset or service but in lower quality version, which consumes less resources. In other example, the admission control module 205 may provide the denied user with an older version of the asset or service, which is less popular and likely to cause very low network traffic, as an alternative to the recent version of the asset or service, which is very popular and likely to causes high network traffic.

In one embodiment, the resource management module 207 may be configured to initiate a management of resources for providing the asset or service. The resources may include network bandwidth and CPU usage consumed for providing the asset or service. The resource management module 207 may determine currently available resources and anticipated necessary resources. The resource management module 207 may determine the anticipated necessary resources based on external data (e.g., anticipated traffic, congestions, etc.) received from an analytics engines. Further, the resource management module 207 may reserve portions of the resources for later providing the asset or service. The resource management module 207 may also allocate portions of the resources or the reserved resources for currently providing the asset or service. In that way, the resource management module 207 allows continuous and uninterrupted delivery of the asset or service to the user, even during the time the network is busy.

In one embodiment, the value scores database 209 may include a database designated to store value scores associated with the users and/or the asset or services. The value scores may be determined by the value determination module 201 and stored in the value scores database 209. Also, the stored value scores may be retrieved by the prioritization module 203 for determining priorities for the users and/or the asset or services. The value scores database 209 may also store the historical value scores associated with the users and/or the asset or service. The historical value scores may include value scores that are determined from the past requests or transactions. The value scores may contain numeric values that can also be converted into different value in different scoring model. Further, the value scores may be related to the revenue information associated with the account information, promotional information, network resource availability information, etc.

In one embodiment, the policies database 211 may include a database designated to store policy rules including admission policy rules, value determination policy rules, prioritization policy rules, etc. Overall, the policy rules may be associated with accessibility of users to the assets or services in various contexts and/or situation. The value determination policy rules may identify, via the value determination module 201, the overall value of the particular asset or service being requested along with the overall value of the customer to the business. The admission policy rules would be considered by the admission control module 205 as part of the comprehensive decision to allow the request. Further, the prioritization policy rule may be considered by the prioritization module 203 as part of determining the priority information for the users. The policy rules can be updated or configured by a policy manager or administrator.

In one embodiment, the comprehensive information database 213 may include one or more database designated to store various information, including the account information, the revenue information, the promotional information, and/or the network resource availability information. The comprehensive information database 213 may store external information received from an analytic engines (e.g., anticipated network traffic profiles or other information not controlled by the service 105 or the value-based platform 103). The account information may include a user's service plan, purchase history, usage, subscription period, etc. The promotional information may include duration of a promotion, promotion rates, promotion price, promotion eligibility, promotion terms and conditions, etc. The network resource availability information may include capacity, consumed amount, remaining amount, anticipated amount, and scalable amount of network bandwidth. The comprehensive information database 213 may also include asset/service information database designated to store asset/service information related to the asset or service, including asset or service's price, play length, type (genre), profit (margin), popularity, rating (grades), released date, producer, etc.

Figure 3:
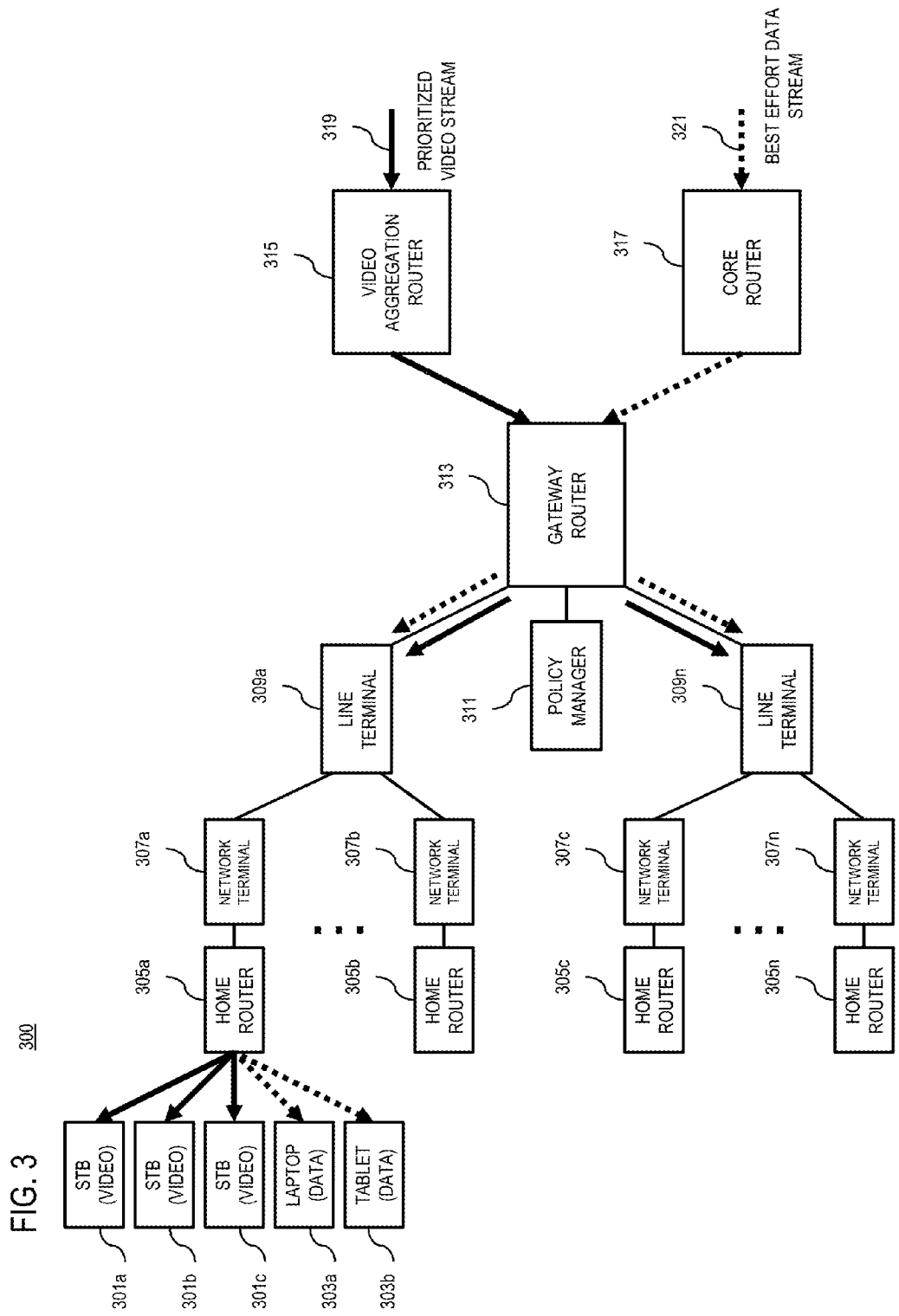
FIG. 3 is a diagram of a system capable of providing value-based resource management and admission control, according to other exemplary embodiment.

FIG. 3 is a diagram of a system capable of providing value-based resource management and admission control, according to other exemplary embodiment. The system 300 of FIG. 3 illustrates the sharing resources (e.g., bandwidth) for providing requested asset or service during a network congestion. In the system 300, the set-top boxes (STBs) 301a-301c (collectively, STB 301) may request paid videos (e.g., VOD) from the servicer provider of the service provider network 109 and the laptop 303a and the tablet 303b (collectively, PC 303) may request free data (e.g., website data) from other service provider of the data network 111. The requests from the STB 301 and the PC 303 may be sent to the gateway router 313, at the same or near time, via the home route 305a, network terminal 307a, and the line terminal 309a. The policy manager 311 may receive the requests from the STB 301 and the PC 303 and determine which request should be prioritized and whether to allow the access to the asset or service. Based on the types of requests, the STB 301's requests for the paid videos may be given higher value scores over the PC 303's request for the free data. Further, based on the prioritization information of the STB 301 and PC 303, the prioritized video stream 319 and necessary resources may be reserved for the STB 301 and the requested videos. Meantime, remaining resource may be allocated for the best effort data stream 321.

When the STB 301's requests are granted, the requested videos may be aggregated in the video aggregation router 315 and delivered to the STB 301 in the prioritized video stream 319 established from the aggregated router 315 to the STB 301. Meantime, the PC 303's requested data may be denied or may be received via a core router 317 and delivered to the PC 303 in the best effort data stream 321. The prioritized video stream 319 provide guarantees that data is delivered or that a user is given a guaranteed quality of service level or a certain priority while the best effort data stream 321 does not provide any guarantees that the data is delivered or that the user is given a guaranteed quality of service level or a certain priority. By prioritizing the requests for paid assets or services over the free assets or services and allocating the resources for the prioritized video stream during network congestion, the system 300 allow providing quality, continuous and uninterrupted asset or service to the STB 301 and optimizing the revenue for the service provider by providing such service.

Figure 4:
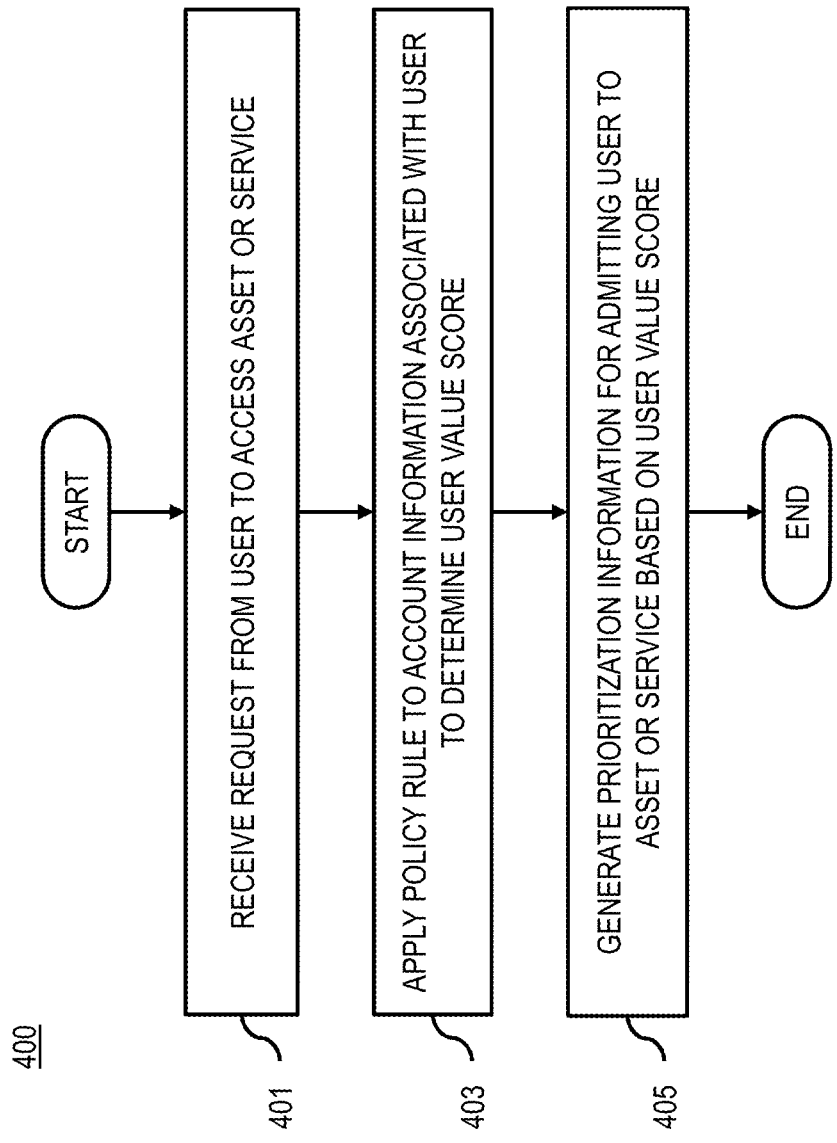
FIG. 4 is a flowchart of a process for providing value-based resource management and admission control, according to an exemplary embodiment.
Figure 5:
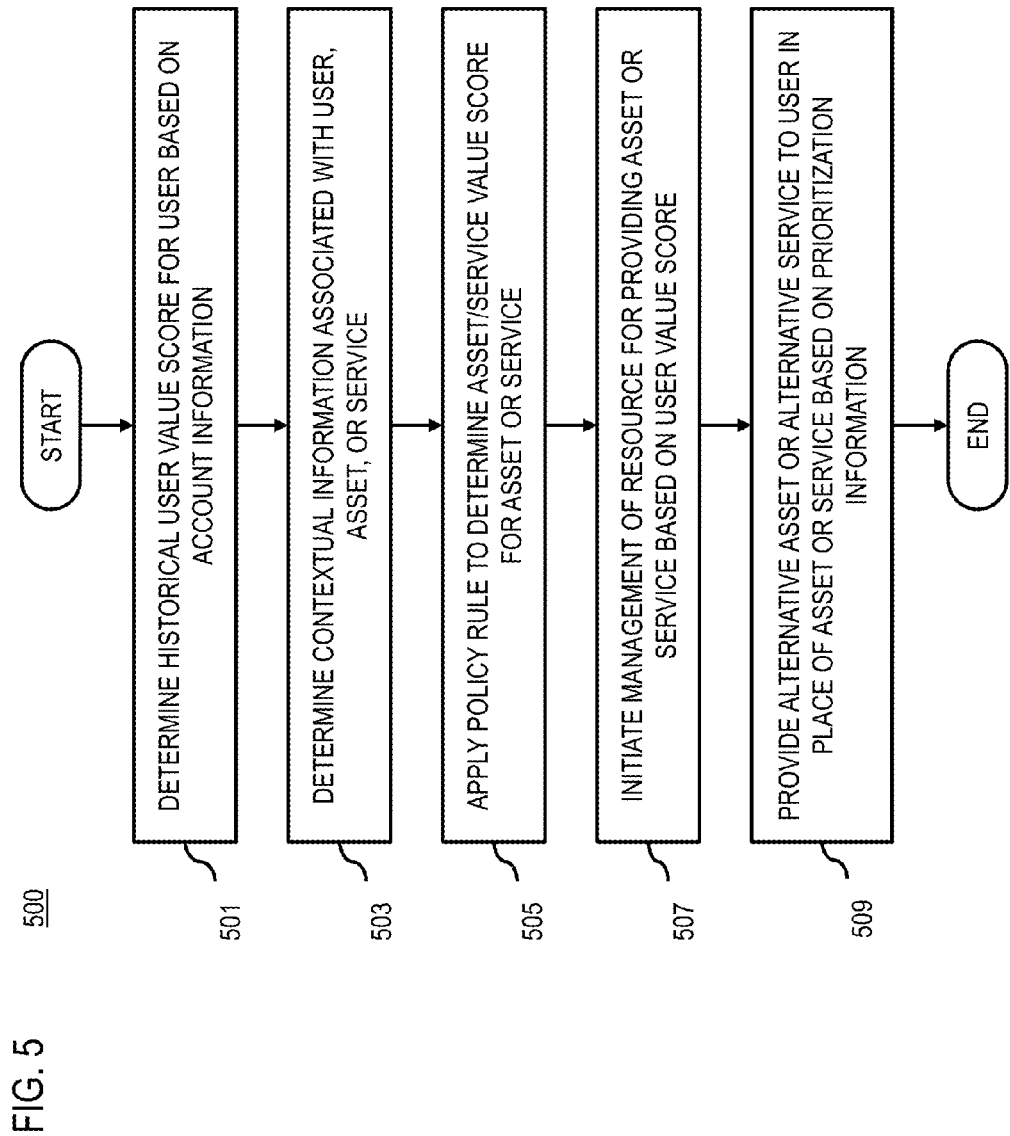
FIG. 5 is a flowchart of a process for providing value-based resource management and admission control, according to other exemplary embodiment.

FIGS. 4 and 5 are flowcharts of processes 400 and 500 for providing value-based resource management and admission control, according to various exemplary embodiments. For illustrative purposes, the processes 400 and 500 are described with reference to FIG. 1. The steps of the processes 400 and 500 may be performed in any suitable order, as well as combined or separated in any suitable manner.

FIG. 4 is illustrated to describe the process 400 of providing value-based resource management and admission control from the perspective of the value-based platform 103.

In one embodiment, the value-based platform 103 may receive a request from a user or a service provider to access an asset, a service, or a combination thereof (step 401). The user may select the asset or service from the user device 101 or the set-top box 102, then the request for the asset or service may be sent from the user device 101 and/or the set-top box 102 to the value-based platform 103. In one embodiment, the selection of asset or service may occur in the service 105, which may in turn send a request to the value-based platform 103 with necessary parameters for the value-based platform 103 to evaluate and either allow or deny the access to the asset or the service. The asset may include multimedia contents such as videos (e.g., movies, TV episodes), music (e.g., mp3 files), software (e.g., game applications), etc. The service may include network services such as video-on-demand service (e.g., VOD), social network service (e.g., Facebook®, Tweeter®, LinkedIn®, etc.), messaging service, broadcast service, game service, video call service, home shopping service, etc. For example, a user may request a VOD movie or a premium TV episode from a cable TV set-top box connect to a cable service provider network, and the request may be received by the cable service provider's resource management and admission control platform.

In one embodiment, the value-based platform 103 may apply a policy rule to account information associated with the user to determine a user value score (step 403). When the value-based platform 103 receives the request to access the asset or service from the user of the user device 101 or the set-top box 102, the value-based platform 103 may retrieve the policy rule from the policies database 211 and the account information associated with the user from the comprehensive information database 213. The value determination module 201 may apply the policy rule to the account information and determine the user value score of the user requesting the asset or service. The policy rules may include value determination policy rules. The account information may include service plan, purchase history, usage, subscription period, etc. In one embodiment, the account information may be convertible to numeric values. The value determination policy rules may include mathematic formula determining the value score based on the converted numeric values of the account information.

In one embodiment, the resource management and admission control platform may retrieve the user's service plan and purchase history information from the user accounts database and determine the value score of the user by applying the value determination policy rules to the user's service plan and purchase history information. Further, a user who is subscribed to a premium package service may be given a higher user value score than other user who is subscribed to a basic package service. Also, a user who frequently purchases assets or services during a given billing cycle may be given a higher user value score than other user who rarely purchases the assets or services during the same billing cycle. Further, a user who uses the service more often may be given a higher user value score than other user who uses the service less often. In certain embodiments, during (marketing) promotion periods, the user who rarely purchases or uses the asset or service may be given a higher user value score over other user who frequently purchases and uses the asset or service.

In one embodiment, the value-based platform 103 may generate prioritization information for admitting the user to the asset, the service, or a combination thereof based on the user value score determined by the value determination module 201 (step 405). The prioritization module 203 may determine prioritization information for admitting the user of the user device 101 or the set-top box 102 to the asset or service of the service 105 based on the value scores determined by the value determination module 201 (e.g., value score of the user, value score of the asset or service, historical user value score, etc.). The prioritization module 203 may generate the prioritization information further based on contextual information associated with the user and/or the asset or service. For example, a user with a higher value score (e.g., a user with paid or premium channel package service) may be given higher priority than other user with a lower value score (e.g., a user with free or basic channel service). In one embodiment, during (marketing) promotion periods, the user with a higher user value score may be given lower priority than the other user with a lower user value score. The priority information may be utilized by the admission control module 205 when admitting the users to the assets or services. For example, a user with higher priority may be granted of an admission to a paid VOD movie while other user with lower priority may be denied of the admission to the same VOD movie or other free TV episode, especially during network congestion periods.

FIG. 5 is illustrated to describe the process 500 of providing value-based resource management and admission control from the perspective of the value-based platform 103.

In one embodiment, the value-based platform 103 may determine a historical user value score for the user based on the account information (step 501). The historical user value score may be retrieved from the value scores database 209 based on the user account information. For example, based on a user's service account number or identifier, the user's previous value scores may be retrieved from the value scores database 209 that compiles the user value scores from user's previous requests and transactions. The historical user score may be stored in the value scores database 209 or the historical value scores database in the comprehensive information database 213 after determined by the value determination module 201 and utilized by the prioritization module 203 and/or the admission control module 205. In one embodiment, the historical user value score may be utilized by the prioritization module 203 in further determining the prioritization information of the user. For example, a user who maintained higher user value scores in the past billing cycles may be given higher priority over other user who had lower value scores in the past billing cycles.

In one embodiment, the value-based platform 103 may determine contextual information associated with the user, the asset, the service, or a combination thereof (step 503). The contextual information may include geographical and temporal information associated with the user and/or the asset or service. In one embodiment, the contextual information may be utilized by the prioritization module 203 in further determining the prioritization information. For example, a user who lives in a city or urban area may be given higher priority over other user who lives in a small town or rural area. In another example, a user who requests an access the asset or service during a prime time (e.g., 8:00 pm-11:00 pm) may be given a lower priority over other user who requests an access to the asset or service during a non-prime time (e.g., 11:00 pm-12:00 am), assuming the users are requesting the accesses to the asset or service from different time zone.

In one embodiment, the value-based platform 103 may apply the policy rule to determine an asset/service value score for the asset, the service, or a combination thereof (step 505). The value determination module 201 may retrieve the policy rule from the policies database 211 and the asset/service information associated with the asset or service from the comprehensive information database 213. The value determination module 201 may apply the policy rule to the asset/service information to determine the asset/service value score of the asset or service requested. The policy rule may include value determination policy rules. The asset/service information may include asset/service's price, play length, type (genre), profit (margin), popularity, rating (grades), released date, producer, etc. The asset/service information may be convertible to numeric values. The value determination policy rules may include mathematic formula determining the asset/service value score based on the converted numeric values of the asset/service information.

In one embodiment, the resource management and admission control platform may retrieve the profit information and popularity information of the asset or service requested. The asset/service value score of the requested asset/service may be determined by applying the value determination policy rules to the profit information and the popularity information. For example, the asset or service that incurs higher profit may be given a higher asset/service value score than other asset or service that incurs lower profit. Also, the asset or service that is high in demand may be given a higher asset/service value score than other asset or service that is low in demand.

In one embodiment, the asset/service value score the determined by the value determination module 201 may be utilized by the prioritization module 203 in determining the prioritization information for admitting the user to the asset, the service, or a combination thereof. For example, a user who is requesting an asset or service with a higher asset/service value score (e.g., higher profit asset or service) may be given a higher priority over other user who is requesting other asset or service with a lower asset/service value score (e.g., lower profit asset or service). For example, during (marketing) promotion periods, the asset or service with a lower asset/service value score (e.g., lower sale asset or service) may be given a higher priority than the other asset or service with a lower asset/service value score (e.g., higher sale asset or service). In that way, the asset or service with a lower asset/service value score may become more available to the users and sale of the asset or service may be increased.

The priority information of the user determined above by the prioritization module 203 may be utilized by the admission control module 205 when admitting the user to the assets or services. For example, during periods of network congestion, a user requesting an asset or service with a higher priority may be granted of an admission to the asset or service while other user requesting other asset or service with a lower priority may be denied of the admission to the other asset or service.

In one embodiment, the policy rule may determine the user value score, the asset/service value score, or a combination thereof based on revenue information associated with the account information, promotional information, network resource availability information, or a combination thereof. The policy rule may include the value determination policy rules. Based on the value determination policy rules, the value determination module 201 may determine a higher value score for the user or asset (or service) that incurs higher revenue to the business. In one embodiment, the user value score may be related to user's purchase capacity, purchase history, purchase potential, etc. For example, a user with constant and active purchase history may be given a higher value score than other user with occasional and inactive purchase history. Further, the user value score and the asset/service value score may be related to current or anticipated high network traffics or congestion. For example, when high network traffic and congestion is anticipated, a user with higher purchase potential or an asset or service with higher sale potential may be given a higher user value score or asset/service value score. On the other hand, during a (marketing) promotion period, a user with lower purchase potential or an asset or service with lower sale potential may be given a higher user value score.

In one embodiment, the value-based platform 103 may initiate a management of a resource for providing the asset, the service, or a combination thereof based on the user value score (step 507). As noted above, the resources may include network bandwidth, CPU usage, etc. necessary to provide the requested asset or service. The resource management module 207 may manage the resources in accordance with the user value score (determined by the value determination module 201) and/or the user priority information (determined by the prioritization module 203). In one embodiment, the management of the resource may include a reservation, an allocation, or a combination thereof of at least a portion of the resource. For example, when higher network traffic or congestion is anticipated, the resource management module 207 may reserve the resources for the users with higher user value score or higher user priority and may allocate the reserved resource for the user's requested asset or service. In that way, the requested asset or service is provided to the user without a discontinuation or an interruption. For another example, when the network traffic is low and the congestion is not anticipated, the resource management module 207 may allocate the resources proportionally to the user value score or the user priority information. For example, when a premium channel package user requests a VOD movie during a prime time of network congestion, network bandwidth required to deliver the VOD movie may be reserved, and then the reserve bandwidth may be used as the VOD movie is streamed to the premium channel package user.

In one embodiment, the value-based platform 103 may provide an alternative asset, an alternative service, or a combination thereof to the user in place of the asset, the service, or a combination thereof based on the prioritization information (step 509). The admission control module 205 may determine that the priority of the user requesting the asset or service is not high enough to get an access to the asset or service. In this case, the admission control module 205 may either deny the access to the asset or service or provide an alternative asset or service in place of the asset or service originally requested. The alternative asset or service may include other asset or service similar to the asset or service originally requested. The other asset or service may be an asset or service that requires lower resources than the originally request asset or service requires. For example, when a user with a lower priority requested a high quality VOD movie, the user may be provided with the same VOD movie but in low quality version. In another example, a user who is denied of an original request to an asset or service due to a low user priority (or a low user value score) may be provided with an option to accept lower quality asset (or service) or other option to upgrade the current service plan, which may allow the user to access the requested asset or service.

Figure 6:
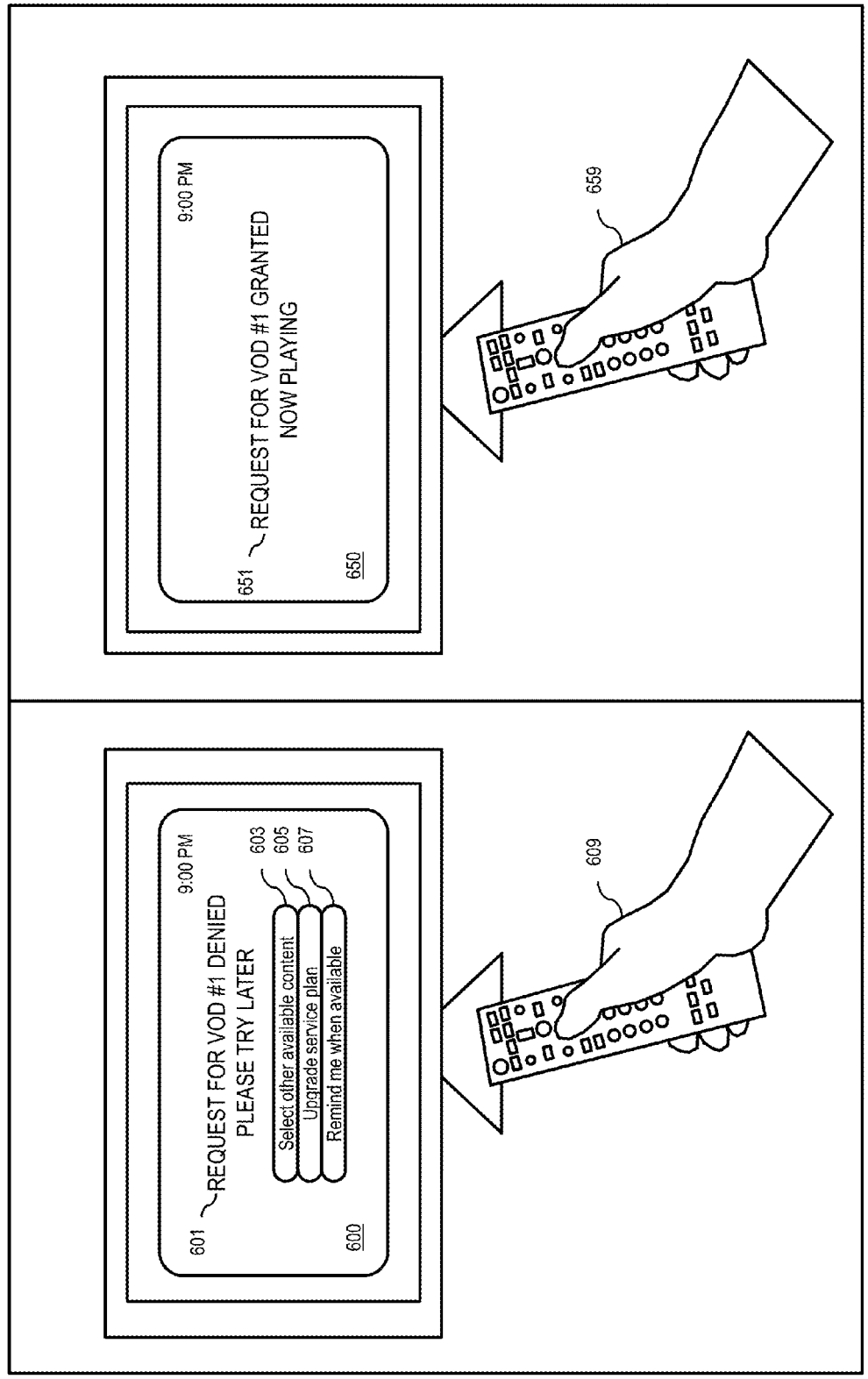
FIG. 6 is a diagram of user interfaces utilized in the processes of FIGS. 4 and 5, according to an exemplary embodiment.

FIG. 6 is a diagram of user interfaces utilized in the processes of FIGS. 4 and 5, according to an exemplary embodiment. The processes of FIGS. 4 and 5 may be utilized not only in the set-top box (as shown in FIG. 6), but also in any other devices providing user inputs (e.g., a smartphone used as a remote controller to a TV or a PC with web interface to the TV). Although, following example is illustrated with respect to providing cable services, the processes may be utilized in providing any other services. A premium user 659 may be a premium channel package subscriber to a cable service and a basic user 609 may be a basic channel subscriber to the same cable service. The premium user 659 and the basic user 609 may navigate through VOD contents on the set-top box connected to a TV or a monitor. The premium user 659 and the basic user 609 may select the same content (VOD #1) during a prime time (e.g., 9:00 pm). During the prime time, the cable service provider's network traffic may be very busy and congested. As the users selected the VOD #1, the value-based platform 103 may receive the requests for the VOD #1 from the set-top box of the premium user 659 and other set-top box of the basic user 609.

Upon receiving the request, the value determination module 201 may determine the user value scores of the premium user 609 and the basic user 659, and an asset/service value score of the VOD #1 in accordance with value determination policy rules. The value determination policies rules may identify higher value score for a premium channel package subscriber over a basic channel subscriber. Based on the determined user value scores, the prioritization module 203 determines the prioritization information for the premium user 609 and the basic user 659 in accordance with prioritization policy rules. The prioritization policy rules may also identify higher priority for a premium channel package subscriber over a basic channel subscriber.

Based on the determined priorities, the admission control module 205 may determine the premium user 659 and the basic user 609's admissions to the VOD #1. The premium user 659 may be given a higher value score and priority than the basic channel user 609 because the premium channel package may incur more revenue to the cable service provider. Thus, the network bandwidth may be reserved and allocated for providing the VOD #1 to the premium channel user 659. In that way, the premium channel user 659 is granted an access to the VOD #1 while the basic channel user 609 is denied access to the VOD #1. The user interface 650 for the premium channel user 659 may render a message 651 indicating the access to the VOD #1 is granted and then renders VOD #1 thereafter.

On the other hand, the user interface 600 for the basic channel user 609 (who is denied of the access to the VOD #1) may render a message 601 indicating that the access to the VOD #1 is denied and may render alternative options 603-607 to choose. The first option 603 to select other available content may lead to a list of other assets or services that have lower value scores or that consume low network resources. The second option 605 to upgrade the user's service plan may lead to a service upgrade or service subscription page where the basic channel user 609 can purchase upgraded service plans as the premium channel user 659. After purchasing the premium channel package, the basic channel user 609's user value score and priority may become higher, such that the basic channel user 609 is allowed the access to the VOD #1. The cable service provider may generate more revenue by the basic channel user 609's subscription to the upgraded service plan. The third option 607 may lead to an alert message that can remind the basic channel user 609 of availability of the VOD #1 when the network traffic is lowered and the network congestion is relieved.

The processes described herein for providing value-based resource management and admission control may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
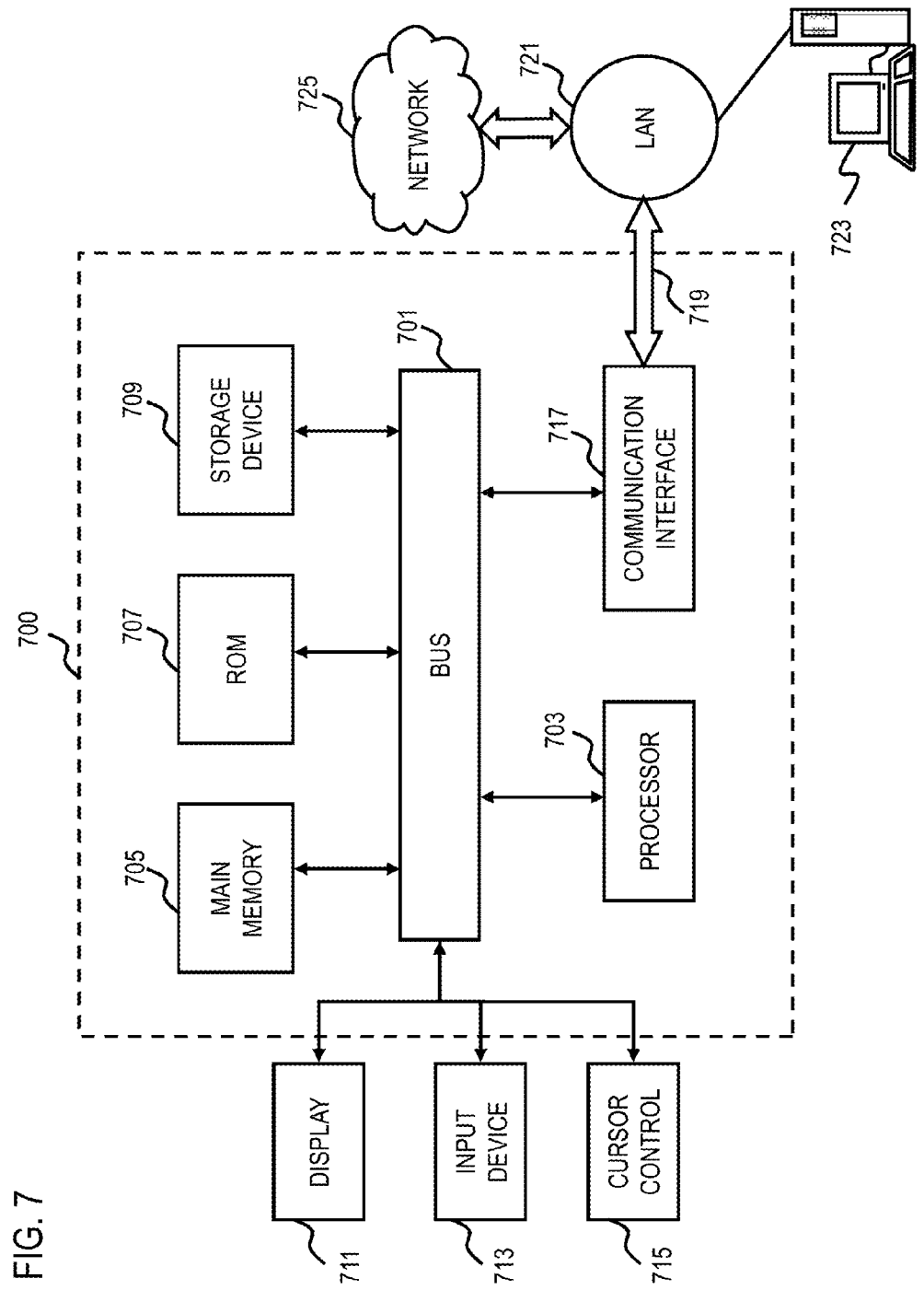
FIG. 7 is a diagram of a computer system that can be used to implement various exemplary embodiments.

FIG. 7 illustrates computing hardware (e.g., computer system 700) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
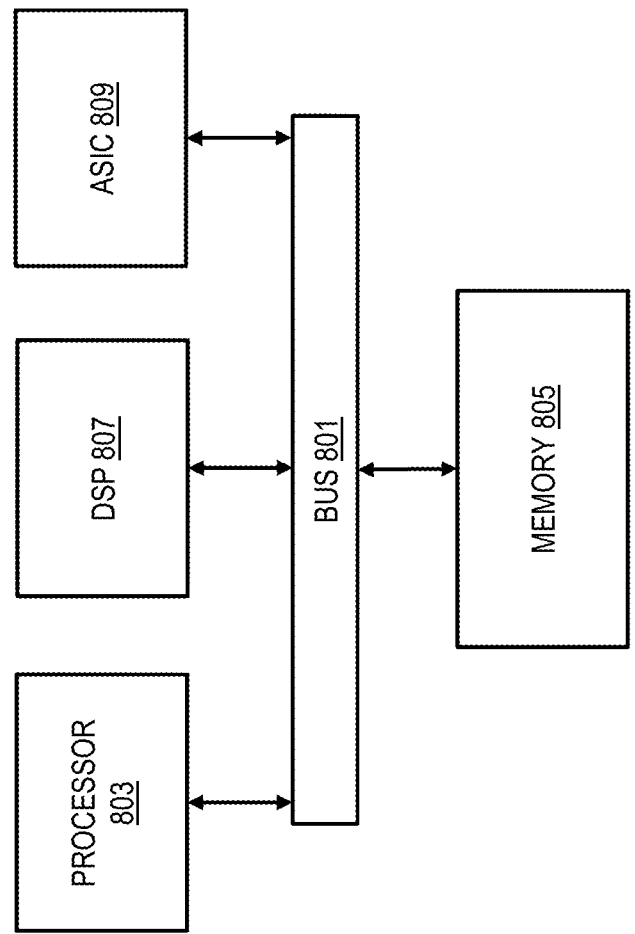
FIG. 8 is a diagram of a chip set that can be used to implement various exemplary embodiments.

FIG. 8 illustrates a chip set 800 upon which an embodiment of the invention may be implemented. Chip set 800 is programmed to provide value-based resource management and admission control and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 4 and 5.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips. In one embodiment, the chip set 800 may include a communication interface (similar to the communication interface 717) to the networks (e.g., networks 107-113).

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide value-based resource management and admission control. The memory 805 also stores the data associated with or generated by the execution of the inventive steps.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving, at a device, a request from a user to access an asset or a service;
   retrieving, by the device and from a first database, a policy rule;
   retrieving, by the device and from a second database, account information associated with the user, wherein the account information includes a service plan corresponding to the user and purchase history information corresponding to the user;
   converting, by the device, the account information to numerical values;
   applying, by the device, the policy rule to the numerical values to determine a user value score, wherein applying the policy rule to the numerical values includes applying the policy rule to numerical values associated with the service plan and to numerical values associated with the purchase history information;

generating, by the device, prioritization information for the user based on the user value score; and allowing, by the device, the user to access the asset or the service in a priority order compared to other users based on the prioritization information.

2. A method of claim 1, further comprising:
initiating a management of a resource for providing the asset or the service based on the user value score.

3. A method of claim 2, wherein the management of the resource includes a reservation or an allocation of at least a portion of the resource.

4. A method of claim 1, further comprising:
applying the policy rule to determine an asset value score for the asset or a service value score for the service,
wherein the prioritization information for allowing the user to access the asset or the service is further based on the asset value score or the service value score.

5. A method of claim 4, wherein the policy rule determines the user value score, the asset value score, or the service value score based on one or more of: revenue information associated with the account information, promotional information, or network resource availability information.

6. A method of claim 1, further comprising:
determining a historical user value score for the user based on the account information,
wherein the prioritization information is further based on the historical user value score.

7. A method of claim 1, further comprising:
providing an alternative asset or an alternative service to the user in place of the asset or the service based on the prioritization information.

8. A method of claim 1, further comprising:
determining contextual information associated with the user, the asset, or the service, wherein the prioritization information is further based on the contextual information.

9. An apparatus comprising:
a memory to store instructions;
a first database;
a second database; and
a processor configured to execute the instructions to:
receive a request from a user to access an asset or a service;
retrieve, from the first database, a policy rule;
retrieve, from the second database, service plan information corresponding to the user and purchase history information corresponding to the user;
convert the service plan information and purchase history information to numerical values;
apply the policy rule to the numerical values corresponding to the service plan information and to the numerical values corresponding to the purchase history information to determine a user value score;
generate prioritization information for the user based on the user value score; and
allow the user to access the asset or the service in a priority order compared to other users based on the prioritization information.

10. An apparatus of claim 9, wherein the processor is further configured to execute the instructions to:
initiate a management of a resource for providing the asset or the service based on the user value score.

11. An apparatus of claim 10, wherein the management of the resource includes a reservation or an allocation of at least a portion of the resource.

12. An apparatus of claim 9, wherein the processor is further configured to execute the instructions to:
apply the policy rule to determine an asset value score for the asset or a service value score for the service,
wherein the prioritization information for allowing the user to access the asset or the service is further based on the asset value score or the service value score.

13. An apparatus of claim 12, wherein the policy rule determines the user value score, the asset value score, or the service value score based on one or more of: revenue information associated with account information of the user, promotional information, or network resource availability information.

14. An apparatus of claim 9, wherein the processor is further configured to execute the instructions to:
determine a historical user value score for the user based on account information of the user,
wherein the prioritization information is further based on the historical user value score.

15. An apparatus of claim 9, wherein the processor is further configured to execute the instructions to:
provide an alternative asset or an alternative service to the user in place of the asset or the service based on the prioritization information.

16. An apparatus of claim 9, wherein the processor is further configured to execute the instructions to:
determine contextual information associated with the user, the asset, or the service, wherein the prioritization information is further based on the contextual information.

17. A system comprising:
a first database;
a second database; and
a hardware processor configured to:
receive a request from a user to access an asset or a service;
retrieve, from the first database, a policy rule;
retrieve, from the second database, service plan information corresponding to the user and purchase history information corresponding to the user;
convert the service plan information and the purchase history information to numerical values;
apply the policy rule to the numerical values corresponding to the service plan and the numerical values corresponding to the purchase history information to determine a user value score;
generate prioritization information for the user based on the user value score; and
allow the user to access the asset or the service in a priority order compared to other users based on the prioritization information.

18. A system of claim 17, wherein the hardware processor is further configured to:
initiate a management of a resource for providing the asset or the service based on the user value score.

19. A system of claim 18, wherein the management of the resource includes a reservation or an allocation of at least a portion of the resource.

20. A system of claim 17, wherein the hardware processor is further configured to:
apply the policy rule to determine an asset value score for the asset or a service value score for the service, wherein the prioritization information for allowing the user to access the asset or the service is further based on the asset value score or the service value score.

* * * * *